UNITED STATES PATENT OFFICE.

JOSEPH DAVIS, OF BROOKLYN, N. Y., ASSIGNOR TO THE DAVIS OIL COMPANY, OF NEW YORK.

PROCESS OF REFINING FAT-OILS.

SPECIFICATION forming part of Letters Patent No. 273,036, dated February 27, 1883.

Application filed January 15, 1883. (No specimens)

*To all whom it may concern:*

Be it known that I, JOSEPH DAVIS, of Brooklyn, in the county of Kings and State of New York, have invented an Improved Process of Refining Animal Fats or Fatty Oils; and I hereby declare that the following is a full, clear, and exact description thereof.

My present invention has for its object the elimination and absolute removal of the objectionable odor and color of animal fats or oils, and has special reference to such fats or oils from which the mucilaginous, albuminous, and other organic substances have been removed by chemical, mechanical, or other means, in order to prevent oxidation, by the subsequent treatment herein referred to.

My invention consists in mechanically forcing one or more currents of air through said fat or oil, previously treated as above described, and contained in vats or tanks, while simultaneously exposing the same to the influence of the light and heat of the sun, or of artificial heat supplied to the apartment where the said receptacles are located, or by circulating steam or hot air through pipes extending through the fat or oil contained therein, or to sun and artificial heat combined, a small quantity of water being preferably employed to "cloud" the fat or oil when thus agitated, in order to facilitate the bleaching of the same and the escape of objectionable odors and gases therefrom, my said treatment leaving the fat or oil light-colored, inodorous, and less liable to spontaneous combustion, and therefore more desirable for manufacturing purposes.

To enable others engaged in the treatment of oils to understand and apply my invention, I will proceed to describe the manner in which I have carried it out.

After removal of the mucilaginous, albuminous, and other organic substances, I deposit the animal oil or fat in pans or tanks, with sufficient water to cloud the same when agitated—say about one per cent. of water to ninety-nine per cent. of the former—the pans or tanks being so located as to expose their contents to the concentrated light and heat of the sun, or to the heat of hot air or steam conducted in pipes to the apartment, or of steam or hot air circulating through pipes extending directly into the oil or fat within the pans or tanks, or to sun and artificial heat combined. I then cause to be forced through said contents one or more currents of air created by a fan-blower, compression-engine, or otherwise, the combined action of the air-currents and the light and heat continued for several days serving to effectually remove the above-enumerated objectionable qualities from the oil or fat, the water therein having been evaporated during the said treatment, a safe, economical, inodorous, and light-colored oil being thus obtained, which ranks superior to any other oil of its class not so treated.

When an animal oil refined by my foregoing process is applied to iron as a lubricant no oxidation or corrosion occurs.

The employment of water, as herein described, is not absolutely necessary; but I prefer it to facilitate the result.

I claim—

1. The within-described process of refining animal fats or fatty oils, consisting, first, in removing the mucilaginous, albuminous, and other organic substances therefrom; secondly, in placing the said fat or oil so treated, with or without a small percentage of water, within the pan or tank; and, finally, agitating the contents by forcing air through the same simultaneous with its exposure to light and heat, substantially as and for the purpose set forth.

2. The product resulting from the within-described treatment—to wit, a safe, inodorous, less corrosive, and light-colored animal oil—substantially as specified.

Witness my hand this 9th day of January, 1883.

JOSEPH DAVIS.

In presence of—
CHAS. W. HAND,
FRANK. FLYNN.